United States Patent [19]

Novak

[11] 3,820,244

[45] June 28, 1974

[54] DIAL COMPASS
[76] Inventor: Warren D. Novak, 325 Douglass Rd., Chappaqua, N.Y. 10514
[22] Filed: May 4, 1971
[21] Appl. No.: 140,068

[52] U.S. Cl. .............................................. 33/27 C
[51] Int. Cl. .............................................. B43l 9/04
[58] Field of Search .................. 33/27 C, 158; 27 B

[56] References Cited
UNITED STATES PATENTS
| | | | |
|---|---|---|---|
| 800,257 | 9/1905 | Abetz .................................... | 33/158 |
| 1,404,794 | 1/1922 | Reitenbaugh ...................... | 33/27 C |
| 1,460,093 | 6/1923 | Costorici ............................. | 33/27 C |
| 1,629,143 | 5/1927 | Bungart ............................... | 33/27 C |
| 2,557,500 | 6/1951 | Fairbanks ........................... | 33/27 B |
| 2,594,457 | 4/1952 | Kunzler ........................... | 33/27 C X |
| 2,867,042 | 1/1959 | Suttoa ................................. | 33/158 |
| 3,264,736 | 8/1966 | Novak ................................. | 33/27 C |

Primary Examiner—Harry N. Haroian
Assistant Examiner—Charles E. Phillips
Attorney, Agent, or Firm—Wood, Herron & Evans

[57] ABSTRACT

A dial compass for effecting precise displacement of two pointed elements of a compass upon rotation of an indicia bearing dial.

13 Claims, 9 Drawing Figures

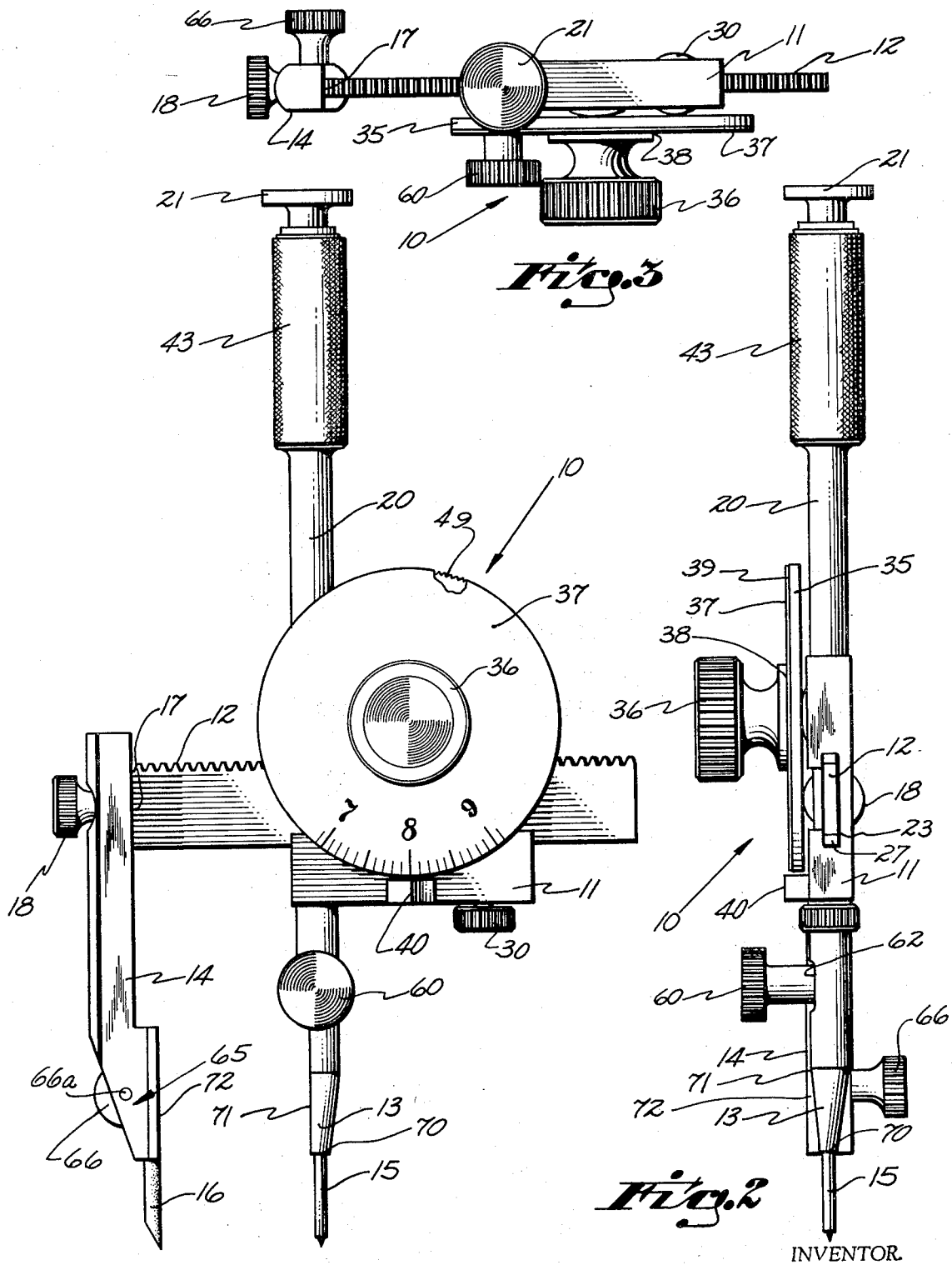

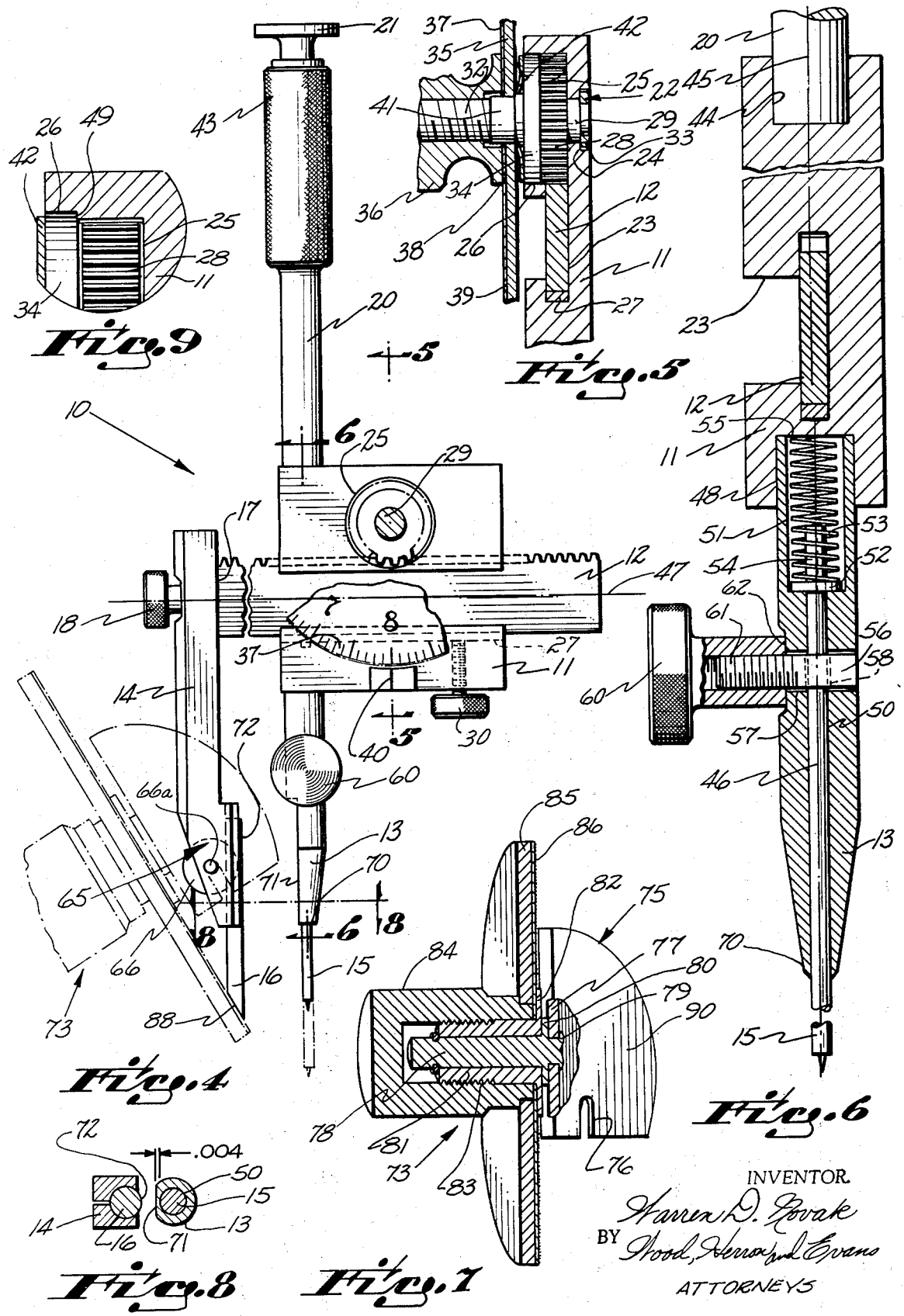

DIAL COMPASS

This invention relates to measuring, drafting and layout instruments and particularly to instruments which are adapted for drawing circles and arcs of circles of accurately predetermined size very rapidly and efficiently. Throughout this application, I will refer to this compass as a drawing or drafting instrument although it should be understood that the instrument is readily adaptable to other uses with other tools to accomplish differing functions. For example, the marking end may be fitted with a lead point, an ink pen, a divider point, a carbide point, or a knife.

In my earlier filed U.S. Pat. No. 3,264,736 there is disclosed a "universal" dial compass for drafting arcs and circles of varying sizes, from very small diameter circles to relatively large ones. This "universal" compass supplants a full set of drafting instruments which might include a "drop" compass for drawing very small circles, a "bow" compass for drawing slightly larger circles having a radius up to approximately 1 inch, a "friction locking" compass for drafting circles up to a radius of 3 or 4 inches and a "beam" compass for making circles of unlimited radius. In addition to its versatility, that compass is superior to all of these other styles of compasses in that it enables a dimension to be dialed directly into the instrument without the necessity for an auxiliary rule or measuring instrument.

Generally the instrument disclosed and described in the above identified issued patent comprises a body member within which a gear rack member is mounted for transverse adjustment movement. A pinion gear is mounted within the body member and is engaged with the gear rack so that rotation of the pinion effects transverse movement of the rack. To rotate the pinion, an indicia bearing adjustment wheel is operatively connected to the pinion gear. Both the rack and the body have an arm depending therefrom within which is mounted an adjustable pointed member. To enable the compass to be used as a "drop" compass, that pointed member which is mounted upon the body extends completely through the body and is slidable therein. This pointed element or needle is offset from the longitudinal axis of the rack and similarly, the pointed member which depends from the arm attached to the rack is offset by the same amount.

In the course of mass producing the above described compass, I have found that it is difficult and relatively expensive to accurately maintain the offset of the two pointed elements from the longitudinal axis of the rack. Accordingly, it has been one objective of this invention to eliminate the offset of the axes of the pointed members from the longitudinal axis of the rack and to eliminate this offset without forfeiting the "drop" compass feature which enables the compass to be utilized to draw or measure very small diameter circles or arcs.

A have accomplished this objective by mounting both pointed elements of both arms of the compass in a common plane with the longitudinal axis of the rack and by terminating the upper end of the pointed element attached to the body member beneath the rack. To enable the compass to be used as a "drop" compass, I have spring loaded the pointed member in the arm of the body member to a downwardly extended position so that the compass may be forced downwardly against this spring bias to place the pointed member in the arm of the rack into engagement with the same surface with which the other spring biased pointed member is engaged.

This utilization of a spring biased depending pointed element in the arm of the body member has one very significant advantage over a conventional "drop" compass in that it enables the force with which the compass lead or marking point is forced into engagement with the marking surface to be varied as desired by the draftsman using the compass. In other words, if the compass is utilized to draw a small circle with a pencil lead, the darkness of the circle drawn by the lead may be varied by varying the downward force on the top of the compass. This is a distinct advantage over a conventional "drop" compass in which gravity moves the marking point into engagement with the marking surfaces.

This construction also has an additional advantage over the construction shown and described in my earlier patent in that it completely eliminates the necessity for drilling a long straight hole through the body to accommodate a long straight needle. The production of this long straight hole through the body and of a long straight needle involves expensive manufacturing techniques which are eliminated by this construction.

Another problem which I have encountered in producing the compass disclosed in the above identified patent is that of accurately positioning the pointed needle in the arm which depends from the body member. In that compass, the metal needle is supported within an arcuate slot located on one side of the arm and the needle is clamped within the slot by a conventional split clamp and thumbscrew.

I have found that when the arcuate slot is machined in the arm, the machining operation produces a burr which must be removed in a subsequent machining operation. Additionally, I have found that the slot often widens in use so that there is a tendency for the pointed needle to wobble within the slot and consequently destroy some of the dimensional accuracy built into the instrument.

As an improvement upon the needle mounting described in the compass of my earlier U.S. Pat. No. 3,264,736, I have found that the needle may be mounted within a circular aperture in lieu of an arcuate slot. This mounting eliminates the necessity for the subsequent deburring operation and completely avoids the tendency of the needle to become loose and wobbly within the slot.

There is also disclosed in my earlier U.S. Pat. No. 3,264,736 a sharpening fixture for sharpening a pencil lead in a plane normal to a vertical plane through the axes of the pencil lead and the compass needle. This fixture utilizes a reciprocally mounted file for abrasively sharpening the lead. I have found that if a rotatable abrasive disc is substituted for the reciprocated file, the fixture may be manufactured less expensively and has better abrasive loading properties than the reciprocated file. In other words, the abrasive disc does not become loaded with lead dust as quickly as the reciprocated file, principally because of the increased surface area of disc over the reciprocated file.

These and other objectives and advantages of this invention will be more readily apparent from the following detailed description of the drawings in which:

FIG. 1 is a front elevational view of a compass embodying the invention of this application;

FIG. 2 is a side elevational view of the compass;

FIG. 3 is a top plan view of the compass;

FIG. 4 is a front elevational view, partially broken away, showing the pencil lead sharpener in phantom, FIG. 5 is a cross sectional view through the body of the compass taken on line 5—5 of FIG. 4, FIG. 6 is a cross sectional view through the body taken on line 6—6 of FIG. 4, FIG. 7 is a cross sectional view through the lead sharpening fixture, FIG. 8 is a cross sectional view through the compass taken on line 8—8 of FIG. 4, and FIG. 9 is an exploded cross sectional view of the circled portion of FIG. 5.

Referring first to FIGS. 1-3, there is illustrated a preferred embodiment of my new compass 10 which comprises a body 11, a rack 12, and a pair of arms 13, 14 depending from the body and rack, respectively. One arm 13 adjustably supports a pointed needle 15 at its lower end and the other arm 14 adjustably supports a pointed pencil lead 16 at its lower end. To facilitate replacement of the marking arm 14 with other marking or measuring instruments such as inking nibs, marking points, etc., the arm 14 is replaceably secured to one end 17 of the rack by a thumb nut 18 threaded over a screw (not shown) affixed to the end 17 of the rack. Additionally, this connection of the arm 14 to the rack enables extensions of the rack to be added so as to increase the maximum radius of circles or arcs which may be drawn or marked with the compass.

A knurled handle post 20 extends vertically from the body 11 and is affixed thereto so that rotation of the post effects rotation of the body. Preferably, a spinner cap 21 is rotatably mounted upon the top of the post 20.

As may be seen most clearly in FIGS. 4, 5 and 6, a T-slot 23 extends transversely through the body 11 and slidably supports the rack 12 therein. Preferably, a gib 27 is located between the bottom of the rack 12 and the slot 23. A knurled knob screw 30 is threaded upwardly through the body 11 into engagement with the bottom of the gib 27 so as to enable the rack 12 to be locked in an adjusted position.

A circular aperture 22 extends through the body perpendicular to the slot 23 and comprises three varying diameter sections 24, 25 and 26. The middle one of these sections 25 intersects the transverse slot 23 as may be seen most clearly in FIG. 4. A pinion 28 is rotatably supported within the aperture 22 upon a shaft 29 with which it is an integral part so that rotation of the shaft effects rotation of the pinion. The rearwardmost end of the shaft 29 is journaled in a bearing surface machined into the body 11 and is captivated against axial movement by a washer 33 which is press fit on the shouldered end of the shaft and bears against a counterbored shoulder in body 11 during rotation of the shaft. The forward end of the shaft 29 has a bearing plate 34 slidably and rotatably mounted thereon. This bearing plate is larger in diameter than the pinion 28 and is nonrotatably mounted within the forwardmost section 26 of the aperture 22. Frictional contact of the plate 34 with the aperture section 26 prevents rotation of this bearing plate 34 in the aperture.

A small diameter threaded section 32 extends outwardly from one end of the shaft 29. Between the threaded section 32 and the bearing plate support section of the shaft 29 is a shouldered section 41 which has a metal disc or dial wheel 35 press fit over it so that the wheel is fixedly secured to the shaft 29. To rotate the shaft 29 and thus the pinion 28 quickly and with course adjustment, a threaded knob 36 is threaded onto the threaded section 32 of the shaft. This knob 36 also serves the function of enabling an indicia bearing disc 37 to be adjusted relative to the disc or wheel 35 in order to calibrate the instrument. This calibration is accomplished by unlocking the rotatable indicia bearing dial 37 when the knob 36 is unscrewed slightly, allowing the dial 37 to be moved to the correct calibrated position relative to the dial wheel 35, and then locking the indicia dial 37 tightly against the dial wheel 35 when the knob 36 is screwed up tightly again.

The knob 36 is used to make the course adjustment quickly such as going from near zero to around 2 inches, but then the knurled edge 49 on the much larger diameter disc 35 is used by the operator to make a fine adjustment of the dial such as setting it to 2.125 inches.

An annular phosphor bronze bent spring washer 42 is mounted over the shaft 29 between the front bearing plate 34 and the dial wheel 35. This spring 42 bears against the front bearing plate 34 and the dial wheel 35. Frictional contact of the spring 42 against this front bearing plate 34 holds the spring 42 against rotation and frictional contact of the spring 42 with the dial wheel holds the wheel 35, shaft 29 and pinion 28 against inadvertent or accidental movement. This spring 42 also holds a desired setting while a circle is marked of a diameter adjusted by a setting of the dial wheel 35.

The replaceable indicia bearing disc 37 is sandwiched between the bottom surface 38 of the knob 36 and the outer surface 39 of the disc or wheel 35. Generally, this disc is graduated in decimal parts of an inch, but it is replaceable by other discs graduated in fractions of an inch or graduated in the metric system, or in inches/foot or nautical miles, etc. The graduated discs 37 may also be replaced by other discs graduated in accordance with selected scales. Replacement of the disc 37 only requires removal of the threaded knob 36 and replacement of the disc 37 over the threaded section 32 of the shaft 29. To reset or calibrate a new indicia bearing disc 37, the pointed elements of the compass are moved into juxtaposition and the scale is set for the radius of the pointed needle of the compass plus the known distance between the pointed elements, as is explained more fully hereinafter. When the disc 37 is properly positioned and locked onto the wheel 35, a dimension may be dialed directly into the compass by rotating the knob 36 and reading the dimension on the disc 37 which is located opposite a reference line or index 40 on the body 11.

To rotate the body and thus generate a circle or arc with the compass, the knurled handle post 20 extends upwardly from the top of the body. The spinner cap 21 is rotatably mounted in the top of the knurled handle with a collar and snap ring in a conventional manner.

As may be seen most clearly in FIG. 6, the lower end of the knurled handle post 20 is press fit into an aperture 44 in the body. The aperture 44 is so positioned that the axis 45 of the knurled handle post 20 is located colinearly with the axis 46 of the needle 15 and intersects the longitudinal axis 47 of the rack.

The needle supporting arm 13 of the compass is press fit into an aperture 48 in the bottom of the body. The axis of this aperture 48 is also located colinearly with the axis 45 of the post 20 and the axis 46 of the needle 15 supported within the arm 13.

Still referring to FIG. 6, it will be seen that the needle 15 is vertically slidable within a longitudinal aperture 50 of the arm 13. At its upper end, this aperture 50 is counterbored as indicated at 51 so as to enable a flange 52 of the needle 15 to be vertically slidable therein. A compression spring 53 surrounds the upper end 54 of the needle and is compressed between the top of the flange 52 and the bottom surface 55 of the recess 48.

Referring now to FIG. 8, it will be seen that the aperture 50 extends completely to the bottom 70 of the arm 13. A flat surface 71 is machined into the lower end of the arm and is engageable with a vertical edge 72 of the lead 16. In contrast to the generally accepted practice of mounting the needle in an arcuate slotted section of the needle supporting arm, the needle 15 is mounted in an aperture 50 which extends to the bottom of the arm. The flat surface 71 does not intersect the aperture 50. In the preferred embodiment, the aperture 50 is offset approximately 0.004 of an inch from the flat surface 71. Consequently, there is no sharp edge or burr created at the intersection of the aperture 50 and the flat surface 71 and there is thus no extra machining operation required to clean up the burr.

To lock the needle 15 in an adjusted position in the arm 13, a conventional cross-drilled lock screw 56 extends through a transverse aperture 57 in the arm. This screw has a vertical aperture 58 through which the needle 15 passes. A thumb nut 60 is threaded over the outer end 61 of the screw and abuts against a flat surface 62 machined into the arm. By rotating the thumb nut 60, the lock screw 61 may be drawn into the thumb nut to frictionally lock the needle in a adjusted position.

The lower end 65 of the lead supporting arm 14 is transversely offset toward the needle supporting arm 13 of the compass. This offset portion 65 of the arm has a vertical arcuate slot machined therein within which a pencil lead 16 is mounted. A thumb nut 66 in cooperation with a screw 66a mounted in the lower end of the arm controls clamping of the lead 16 within this slot as is conventional in most compasses.

Referring to FIGS. 4 and 7, there is illustrated a fixture 73 for sharpening the lead 16 mounted in the arm 14 of the compass. This fixture 73 accurately sharpens the lead in a plane normal to the plane of the axes of the needle point and the pencil lead so that the dimensional accuracy of the instrument is maintained.

A generally yoke shaped body 75 of the fixture 73 has a pair of side flanges 90—90 adapted to be received over the sides of the arm 14. A recess 76 in the lower end of each of the body flanges 90—90 enables the body to be fitted over the arm and the recesses to be fitted over the thumb nut 66 and screw 66a of the arm. The thumb nut 66 then fixes the vertical position of the body 75 on the arm.

A web 77 of the body 75 interconnects the two side flanges of the body and supports a spindle 78 which is fixedly secured to the web 77. Preferably, the attachment of the spindle 78 to the web is accomplished by expanding or spreading one end 79 of the spindle so as to clamp the web between the expanded end 79 and a flange 80 of the spindle.

A sleeve 81 is rotatably mounted upon the spindle 78. This sleeve has a flange 82 at one end and is threaded, as indicated at 83, at its opposite end. A knurled knob 84 is threaded over the sleeve 81 and has a pressure plate 85 fixedly secured thereto. A disc 86 of emery paper or abrasive material is sandwiched between the flange 82 of the sleeve 81 and the pressure plate 85. Alternatively, the abrasive may be sputtered carbide or sapphire particles electrically bonded directly to the plate 85.

To sharpen the lead 16 of the compass, the yoke-shaped body is fitted over the sides of the arm 14, and the notch 76 in the bottom of the flanges of the body is placed over the lead clamping thumb nut 66. The body is then pivoted about this thumb nut to a position in which the emery paper or abrasive disc 86 engages the pointed end 88 of the lead. The knob 84 may then be rotated so as to rotate the pressure plate and the abrasive disc against the lead and thereby effect sharpening of the lead.

In operation, the compass may be used either as a drop compass with the needle point 15 free for sliding movement within the arm 13, or as a conventional fixed point compass with the needle 15 clamped within the arm 13. The choice is primarily dependent upon the size of the circle or arc being drawn or measured with the instrument.

When the compass is used as a drop compass, the thumb nut 60 is loosened so that the needle 15 extends downwardly to the position indicated in phantom in FIG. 4. The point of the needle 15 is then placed on the surface to be marked or measured, the index finger is placed on the top of the spinner cap 21, and the compass is rotated between the thumb and forefinger while a downward force is applied to the spinner cap. The force applied to the top of the cap is determinative of the darkness of the pencil mark or scribed line made on the surface.

If the compass is to be used as a fixed point compass, the needle 15 is set to an elevation in which the bottom of the needle is located in the plane of the point of the lead. The needle 15 is then locked in this position by tightening the thumb nut 60. The desired dimension may then be dialed directly into the compass by rotation of the dial 35 and the compass is used by placing the index finger on the top of the spinner cap and rotating the compass between the thumb and forefinger. For progressively larger circles, the knurled handle 43 is grasped between the thumb and first finger and rotated with a rolling motion between these two fingers (as in the use of a conventional compass).

While I have only described a single preferred embodiment of my improved compass, those persons skilled in the arts to which this invention pertains will readily appreciate numerous changes and modifications which may be made without departing from the spirit of my invention. For example, persons skilled in this art will appreciate that a removable spring loaded needle could be substituted for the needle 46 and the spring element 53 in the arm 13 thereby eliminated. Therefore, I do not intend to be limited except by the scope of the appended claims.

Having described my invention, I claim:

1. A compass comprising a body member having a handle post extending vertically therefrom, a spinner cap rotatably mounted on the upper end of said handle post, a gear rack member mounted for straight line adjustable movement within said body member, said rack member protruding on opposite transverse sides from said body member, said body member including guiding means for maintaining said gear rack member in alignment therein during said movement, a pinion gear mounted within said body member and in engagement with said gear rack for controlling the adjustable movement of said gear rack member, said rack member having a first arm depending therefrom and said body member having a second arm depending therefrom, a first pointed element depending from and supported upon the lower end of said first arm, a second pointed element depending from and supported upon the lower end of said second arm, said pointed members each being perpendicular to the direction of movement of said rack member, said second pointed element being colinearly aligned with said spinner cap and handle post so that said compass is adapted to be rotated by a person placing an index finger on said spinner cap and rotating said handle post between the thumb and index finger, an adjustment wheel fixedly mounted upon a shaft which is operatively connected with said pinion so that rotational adjustment of said wheel effects rotation of said pinion, indicia means on the face of said wheel for measuring adjustable movement of said rack upon rotation of said wheel, the longitudinal axis of the second pointed element depending from the second arm being located in a common vertical plane with the longitudinal axis of said rack member, and said second pointed element being spring-biased downwardly.

2. The compass of claim 1 wherein said second pointed element is surrounded by a compression spring located within said second arm.

3. The compass of claim 2 wherein said second pointed element has a stop secured thereto to limit movement of said second pointed element relative to said second arm.

4. The compass of claim 1 wherein said indicia means is adjustably mounted upon the face of said wheel and includes a calibration mark enabling said indicia means to be accurately positioned on said wheel when said first and second pointed elements are located in juxtaposition.

5. The compass of claim 1 wherein the arm of said body member includes an adjustable screw for securing said pointed element in an adjusted position.

6. The compass of claim 1 wherein said first arm is secured to said rack member by a thumb nut to facilitate replacement of said first arm.

7. The compass of claim 1 which further includes a vertical extension from said body member for rotating said compass, said extension having a central axis located colinearly with the axis of the pointed element depending from the arm of said body member.

8. The compass of claim 1 which further includes a bearing plate axially slidable upon said shaft, said bearing plate being located on said shaft between said pinion gear and said adjustment wheel, and a spring operable to bias said bearing plate into engagement with said body with a force sufficient to maintain said bearing plate, shaft and pinion in an angularly adjusted position.

9. The compass of claim 8 wherein said spring is an annular bent spring mounted over said shaft.

10. A compass comprising a body member, a gear rack member mounted for straight line adjustable movement within said body member, said rack member protruding on opposite transverse sides from said body member, said body member including guiding means for maintaining said gear rack member in alignment therein during said movement, a pinion gear mounted within said body member and in engagement with said gear rack for controlling the adjustable movement of said gear rack member, an adjustment wheel fixedly mounted upon a shaft which is operatively connected with said pinion so that rotational adjustment of said wheel effects rotation of said pinion, indicia means on the face of said wheel for measuring adjustable movement of said rack upon rotation of said wheel, said rack member having a first arm depending therefrom and said body member having a second arm depending therefrom, said second arm having a vertical bore therein, a first pointed element depending from and supported upon the lower end of said first arm, a second pointed element slideably mounted within said vertical bore of said second arm, said second pointed element depending from the lower end of said second arm, said pointed elements each being perpendicular to the direction of movement of said rack member, said second pointed element having a longitudinal axis located in a common vertical plane with the longitudinal axis of said rack member, a compression spring located within said bore of said second arm and engaging said second pointed element, said spring being operable to bias said second pointed element downwardly, a transverse bore located in said second arm and intersecting said first vertical bore, and a threaded screw mounted within said transverse bore and engageable with said second pointed element to secure and lock said second pointed element in any one of a plurality of adjusted positions.

11. The compass of claim 10 in which said threaded screw has a vertical bore therein, said second pointed element extending through said vertical bore of said screw.

12. The compass of claim 10 which further includes a bearing plate axially slideable upon said shaft, said bearing plate being located on said shaft between said pinion gear and said adjustment wheel, and a spring operable to bias said bearing plate toward said pinion with a force sufficient to maintain said bearing plate, shaft, and pinion in an angularly adjusted position.

13. A compass comprising a body member, a gear rack member mounted for straight line adjustable movement within said body member, said rack member protruding on opposite transverse sides from said body member, said body member including guiding means for maintaining said gear rack member in alignment therein during said movement, a pinion gear mounted within said body member and in engagement with said gear rack for controlling the adjustable movement of said gear rack member, said rack member having a first arm depending therefrom and said body member having a second arm depending therefrom, a first pointed element depending from and supported upon the lower end of said first arm, a second pointed element depending from and supported upon the lower end of said second arm, said pointed members each being perpendicular to the direction of movement of said rack member, an adjustment wheel fixedly mounted upon a shaft which is operatively connected with said pinion so that rotational adjustment of said wheel effects rotation of said pinion, indicia means on the face of said wheel for measuring adjustable movement of said rack upon rotation of said wheel, said shaft being supported on one side of said pinion by a bearing within said body, said shaft being further supported between said pinion gear and said adjustment wheel by a bearing plate axially slideable upon said shaft, and a spring operable to bias said bearing plate toward said pinion with a force sufficient to maintain said bearing plate, shaft, and pinion in an angularly adjusted position.

* * * * *